(12) United States Patent
Sperber

(10) Patent No.: US 9,580,655 B1
(45) Date of Patent: Feb. 28, 2017

(54) FLAME-RETARDANT FORMULATIONS AND METHODS RELATING THERETO

(71) Applicant: NTOFR LLC, Cardiff-by-the-Sea, CA (US)

(72) Inventor: Donald S. Sperber, Cardiff-by-the-Sea, CA (US)

(73) Assignee: NTOFR LLC, Cardiff-by-the-Sea, CA (US)

( * ) Notice: Subject to any disclaimer, the term of this patent is extended or adjusted under 35 U.S.C. 154(b) by 0 days.

(21) Appl. No.: 15/355,221

(22) Filed: Nov. 18, 2016

Related U.S. Application Data

(63) Continuation of application No. 14/502,034, filed on Sep. 30, 2014.

(60) Provisional application No. 61/884,785, filed on Sep. 30, 2013.

(51) Int. Cl.
*C09K 21/04* (2006.01)
*C09K 21/02* (2006.01)

(52) U.S. Cl.
CPC .............. *C09K 21/04* (2013.01); *C09K 21/02* (2013.01)

(58) Field of Classification Search
None
See application file for complete search history.

(56) References Cited

U.S. PATENT DOCUMENTS

| 2,526,083 | A | * | 10/1950 | Nielsen | C09K 21/04 106/18.12 |
|---|---|---|---|---|---|
| 3,317,276 | A | * | 5/1967 | Brown, Jr. | C01C 1/18 149/46 |
| 3,418,255 | A | * | 12/1968 | Brown, Jr. | C01C 1/18 252/397 |
| 3,647,412 | A | * | 3/1972 | Brown, Jr. | C05C 1/02 71/35 |
| 4,725,382 | A | * | 2/1988 | Lewchalermwong | C09K 21/04 106/18.13 |
| 4,999,066 | A | * | 3/1991 | Sherif | C04B 28/34 106/690 |
| 5,076,969 | A | * | 12/1991 | Fox | C09K 21/10 106/18.12 |
| 5,082,640 | A | * | 1/1992 | Chau | C09K 11/701 252/301.4 P |
| 5,391,246 | A | * | 2/1995 | Stephens | E04D 7/00 156/71 |
| 2004/0031303 | A1 | * | 2/2004 | Whitehurst | C05C 9/00 71/28 |

* cited by examiner

*Primary Examiner* — Joseph D Anthony

(57) ABSTRACT

Flame retardant formulations comprising boric acid and diammonium phosphate are disclosed herein. Such formulations are in an aqueous form or a powdered form. Methods of generating a flame retardant formulation are also disclosed herein. Such methods comprise combining boric acid and diammonium phosphate in an aqueous solution, wherein the boric acid and the diammonium phosphate is in a ratio range selected from the group consisting of 1:1 to 99:1 and 1:1 to 1:99; and heating the solution until dissolved; thereby generating a flame retardant formulation, wherein the flame retardant formulation consists essentially of boric acid and diammonium phosphate.

12 Claims, No Drawings

FLAME-RETARDANT FORMULATIONS AND METHODS RELATING THERETO

RELATED APPLICATIONS

The present application claims priority to U.S. patent application Ser. No. 14/502,034, filed on Sep. 30, 2014, entitled "FLAME-RETARDANT FORMULATIONS AND METHODS RELATING THERETO," and U.S. Provisional Application Ser. No. 61/884,785, filed on Sep. 30, 2013, entitled "FLAME-RETARDANT FORMULATIONS AND METHODS RELATING THERETO," the entire disclosure of which is incorporated by reference herein.

FIELD OF THE INVENTION

The present invention relates to the field of manufacturing flame retardants for treating fires and/or for prevention thereof.

BACKGROUND OF THE DISCLOSURE

Flame retardants are generally well known for the treatment of fires and as a fire prevention tool. They are chemical compounds used in thermosets, textiles and coatings that inhibit or resist the spread of fire. Flame retardants are typically added to consumer products to meet flammability standards for furniture, textiles, electronics, and insulation.

Many combinations of inorganic and organic chemicals such as chlorinated organic compounds, amino compounds, asbestos, urea, melamine, antimony trioxide and mixtures thereof, have been used in flame retardants. However, many of these compounds utilize toxic chemicals such as halogenated compounds that have negative effects on the environment and human health. Indeed, these toxic compounds have been known to degrade over time in the end products in which they've been either integrated in or coated on, emitting toxic gasses that have been linked to several cancers and neurological diseases. (Roze et al. Environmental Health Perspectives (December 2009) 117(12): 1953-1958)

Many of the starting chemicals and halogenated compounds used in current flame retardancy methods require additives in the manufacturing process to neutralize pH. In addition, existing flame retardant formulations tend to impair the integrity of the materials in which they are integrated in or coated on. Such flame retardant formulations are readily available in the art. For example, U.S. Pat. No. 6,270,694 discloses urea-organic compound-based flame retardants.

The non-toxic flame retardant formulations of the present invention are generated by the reaction of boric acid with diammonium phosphate. U.S. Pat. No. 5,082,640 discloses methods of reacting boric acid with diammonium phosphate for generating luminescent grade boron phosphate for fluorescent lamp phosphors. However, the methods disclosed require a wash step with ammonium hydroxide which washes away excess boric acid. The resulting luminescent grade boron phosphate contains a homogenous mix of equal parts boric acid and diammonium phosphate.

Accordingly, these references do not disclose the embodiments of the present invention.

Therefore, a need exists in the art for an improved non-toxic, yet effective flame retardant formulation. In particular, there exists a need for an improved method of bringing flame retardancy to products without impairing the desired structural integrity of the materials within the products. The flame retardants of the present invention offer such improved flame retardant formulations and methods for bringing flame retardancy to consumer products.

All documents and references cited herein and in the referenced patent documents, are hereby incorporated herein by reference.

SUMMARY OF THE INVENTION

The present inventors have developed an improved flame retardant formulation over known flame retardant formulations. The flame retardant formulation disclosed herein comprises a mixture of boric acid and diammonium phosphate. In certain embodiments, the flame retardant formulation of the invention consists essentially of a mixture of boric acid and diammonium phosphate. In other embodiments, the flame retardant formulation comprises unequal parts of boric acid to diammonium phosphate. The formulation disclosed herein is a non-toxic flame retardant lacking any halogenated compounds or additives yet is sufficiently effective to meet at least the American Society for Testing Materials (ASTM) Class A Rating and/or equivalent and/or comparable flame spread rating tests. Accordingly, the present invention provides improvements in starting chemicals, manufacturing, and integration into end products.

Disclosed herein is a flame retardant formulation comprising boric acid and diammonium phosphate. In certain embodiments, disclosed herein is a flame retardant formulation consisting essentially of boric acid and diammonium phosphate. In other embodiments, disclosed herein is a flame retardant formulation comprising unequal parts of boric acid to diammonium phosphate.

In addition, disclosed herein is a flame retardant formulation consisting essentially of boric acid and diammonium phosphate, wherein the boric acid and the diammonium phosphate are not in equal parts; and wherein the flame retardant formulation is in an aqueous form.

Further, disclosed herein is a flame retardant formulation consisting essentially of boric acid and diammonium phosphate, wherein the boric acid and the diammonium phosphate are not in equal parts; and wherein the flame retardant formulation is in a powdered form.

In addition, disclosed herein is a flame retardant formulation comprising boric acid, diammonium phosphate, ammonium sulfate, and molybdenum. In a further embodiment, the flame retardant formulation is in an aqueous form. In a further embodiment, the flame retardant formulation comprises 20-30% solids in an aqueous solution. In a further embodiment, the flame retardant formulation comprises 30% solids in an aqueous solution.

Further disclosed herein is a flame retardant formulation comprising boric acid, diammonium phosphate, ammonium sulfate, molybdenum, magnesium carbonate, and calcium chloride. In a further embodiment, the flame retardant formulation is in an aqueous form. In a further embodiment, the flame retardant formulation comprises a surfactant. In a further embodiment, the flame retardant formulation comprises liquid latex. In a further embodiment, the flame retardant formulation comprises 20-30% solids in an aqueous solution. In a further embodiment, the flame retardant formulation comprises 20% solids in an aqueous solution.

Also disclosed herein is a method of generating a non-toxic flame retardant formulation comprising: adding boric acid and diammonium phosphate to an aqueous solution, wherein the boric acid and the diammonium phosphate are in a ratio range selected from the group consisting of 1:1 to 99:1 and 1:1 to 1:99; heating the solution until dissolved; thereby generating the non-toxic flame-retardant formulation comprising a mixture of boric acid and diammonium phosphate. In certain embodiments of the method, boric acid and diammonium phosphate are in a ratio range selected from the group consisting of 2:1 to 99:1 and 1:2 to 1:99. In another embodiment, the method comprises adding ammonium sulfate, and molybdenum. In another embodiment, the method comprises adding ammonium sulfate, molybdenum, magnesium carbonate, and calcium chloride. In another embodiment, the method comprises adding a surfactant. In another embodiment, the method comprises adding liquid latex. In further embodiment, the method comprises adding 20-30% solids in an aqueous solution. In a further embodiment, the method comprises adding 20% solids in an aqueous solution. In a further embodiment, the method comprises adding 30% solids in an aqueous solution.

In another embodiment, the method of generating a flame retardant formulation further comprises heating the solution to molten.

In a further embodiment, the method of generating a flame retardant formulation comprises combining the flame retardant formulation with a binder or carrier.

In a further embodiment, the method of generating a flame retardant formulation comprises a process of making the flame retardant formulation into a powder, wherein the process is selected from the group consisting of drying, grinding, ball milling, wet bead milling, dry bead milling, spray drying, sifting, de-lumping, atomizing, flash drying, pulverizing, classifying, mixing, and a combination thereof.

In a further embodiment, the method of generating a flame retardant comprises coating materials with the flame retardant formulation, wherein the materials are natural materials or synthetic materials. In an even further embodiment, the materials are selected from the group consisting of foams, paints, wood, wood composites, and resins.

In other embodiments, the flame retardant formulation and methods of making and using the same in the preceding paragraphs may additionally comprise silica.

In still other embodiments, the flame retardant formulation and methods of making and using the same in the preceding paragraphs may additionally incorporate any of the preceding or subsequently disclosed embodiments.

The Summary of the Invention is not intended to define the claims nor is it intended to limit the scope of the invention in any manner.

Other features and advantages of the invention will be apparent from the following Drawings, Detailed Description, and the Claims.

DETAILED DESCRIPTION OF THE EMBODIMENTS

The present invention is intended to cover any and all modifications, alternatives, and equivalents falling within the spirit and scope of the invention.

Unless otherwise defined, all technical terms used herein have the same meaning as commonly understood by one of ordinary skill in the art to which this technology belongs.

Flame retardants are used to treat fires or as a preventative measure for providing flammable components with a level of flame retardancy. Flame retardants are typically coated onto or incorporated into natural or synthetic materials such as, but not limited to, foam, paints, rubber, resins, wood, and wood composites. Flame retardant products made from these materials find many uses in the field such as, without limitation, in building construction, insulation, sound proofing, cushioning, décor, furniture, upholstery, coatings, paints, stains, boating, automobile parts, and air travel.

The flame retardant formulation disclosed herein comprises boric acid and diammonium phosphate. In one embodiment, the flame retardant formulation consists essentially of boric acid and diammonium phosphate. In one embodiment, the flame retardant formulation consists essentially of boric acid and diammonium phosphate, wherein the boric acid and the diammonium phosphate are not in equal parts. The flame retardant formulation is in either an aqueous form or a powdered form. This type of a formulation would find use as a treatment for existing fires and/or as a preventative application. The flame retardant formulation can be combined with a binder or carrier to generate a waterproof flame retardant to apply by coating or spraying to existing surfaces and/or to directly incorporate into materials and/or consumer products.

Boric acid is well known and readily available to the skilled artisan. Boric acid is a weak acid of boron and has the chemical formula $H_3BO_3$ (sometimes written $B(OH)_3$) and exists in the form of colorless crystals or white powder that dissolves in water.

Likewise, diammonium phosphate (DAP), also known as ammonium phosphate dibasic, is well known and readily available to the skilled artisan. Diammonium phosphate has the chemical formula $(NH_4)_2HPO_4$ is one of a series of water-soluble ammonium phosphate salts that can be produced when ammonia reacts with phosphoric acid.

Chemical entities and/or compounds such as ammonium sulfate, molybdenum, magnesium carbonate, calcium chloride, and silica are readily available and known in the art. For example, ammonium sulfate, $(NH_4)_2SO_4$, is an inorganic salt comprising 21% nitrogen as ammonium cations and 24% sulfur as sulfate anions. Molybdenum, $_{42}Mo$, is a Group 6 chemical element, a free element, occurring in various oxidation states in minerals as a silvery metal with a gray cast. Magnesium carbonate, $MgCO_3$, is an inorganic salt that is a white solid existing in several hydrated and basic forms. Calcium chloride, $CaCl_2$, is a salt of calcium and chlorine and behaves as a typical ionic halide. Silica, also known as silicon dioxide is a chemical compound that is an oxide of silicon most commonly found in nature as sand or quarts as well as in cell walls of diatoms.

In certain embodiments, the flame retardant formulation disclosed herein comprises boric acid, diammonium phosphate and a chemical compound or entity selected from the group consisting of ammonium sulfate, molybdenum, magnesium carbonate, calcium chloride and a combination thereof. In a further embodiment, the flame retardant formulation is in an aqueous form. In a further embodiment, the flame retardant formulation comprises 20-30% solids in an aqueous solution. In a further embodiment, the flame retardant formulation comprises 30% solids in an aqueous solution. In a further embodiment, the flame retardant formulation comprises 20% solids in an aqueous solution. In a further embodiment, the flame retardant formulation comprises a surfactant. In a further embodiment, the flame retardant formulation comprises liquid latex. In a further embodiment, the flame retardant formulation may comprise silica.

The flame retardant formulations of the present invention can be combined effectively with materials, without altering the structural integrity of the material and/or resulting product. The amount of the flame retardant formulation necessary in any one application varies widely depending upon the type of material. For example, with respect to cotton or other natural materials, a very low percentage, such as a minimum of 3%, of the flame retardant formulation may be used in combination with the material. However, the amount of the flame retardant formulation may be as high as 80% in some materials when a thermal barrier is desired. In some embodiments, the amount of the flame retardant formulation in a materials application will be in the 5%-25% or the 15%-35% range, particularly when used in combination with synthetic materials such as foams and/or resins.

The flame retardant formulations disclosed herein are uniquely suited to lessening the compositional requirements in the end products. In this respect, the formulations, through their flame retardant synergistic qualities and non-halogenated eco-friendly chemical structures, advantageously preserve the structural integrity of the materials and end products with which they are combined.

The flame retardant formulations of the present invention are produced by chemically reacting boric acid with diammonium phosphate. Methods disclosed herein utilize boric acid and diammonium in a 1:1 ratio to 99:1 ratio range of either the boric acid or the diammonium phosphate. Flame retardant formulations comprising boric acid and diammonium phosphate may comprise boric acid that is 1-50% weight percent boric acid and/or diammonium phosphate that is 1-50% weight percent diammonium phosphate. The boric acid and the diammonium phosphate are mixed and then heated in an aqueous solution until they dissolve or become molten. The flame retardant product produced by the reaction may then either be used as a flame retardant as-is, or may be combined with a binder or carrier. The flame retardant may be generated in a powder form. Methods for generating flame retardants in a powdered form are well known by the skilled artisan and are readily available in the art. Such methods include, without limitation, drying, grinding, ball milling, wet bead milling, dry bead milling, spray drying, sifting, de-lumping, atomizing, flash drying, pulverization, classifying, mixing in water (e.g., jet, paddle, shear). The method of the manufacturing process chosen would depend on factors such as the type of material and/or product to be treated, how it would be treated, and/or how the resulting treated product will be used.

Additionally, flame retardant formulation methods of the present invention may further comprise chemically reacting boric acid and diammmonium phosphate with a chemical entity or compound selected from the group consisting of ammonium sulfate, molybdenum, magnesium carbonate, calcium chloride, silica, and a combination thereof. In a further embodiment, the methods generate a flame retardant formulation in an aqueous form. In a further embodiment, the flame retardant formulation methods comprise adding and/or reacting 20-30% solids in an aqueous solution. In a further embodiment, the flame retardant formulation methods comprise adding and/or reacting 30% solids in an aqueous solution. In a further embodiment, the flame retardant formulation methods comprise adding and/or reacting 20% solids in an aqueous solution. In a further embodiment, the flame retardant formulation methods comprise adding a surfactant such as, without limitation, adding a surfactant that is 1-15% weight percent surfactant. In a further embodiment, the flame retardant formulation methods comprise the addition of liquid latex such as, without limitation, adding liquid latex that is 5-40% weight percent liquid latex.

The flame retardant formulations and methods of making thereof may comprise the use of chemically reacting boric acid and diammonium phosphate with a chemical entity or compound selected from the group consisting of ammonium sulfate, molybdenum, magnesium carbonate, calcium chloride, silica, and a combination thereof; wherein, the boric acid is 1-30% weight percent boric acid and/or the diammonium phosphate is 1-30% weight percent diammonium phosphate and/or the ammonium sulfate is 1-30% weight percent ammonium sulfate and/or the molybdenum is 1-15% weight percent molybdenum and/or the magnesium carbonate is 1-15% weight percent magnesium carbonate and/or the calcium chloride is 1-30% weight percent calcium chloride.

The methods disclosed herein may additionally utilize silica in the process of flame retardant formulation and/or the use thereof. Silica may be added to a dry or powdered form of a flame retardant formulation, i.e., as a flow agent; and/or may be added to any formulation as needed to enhance the properties of the flame retardant, and/or to facilitate the application of the flame retardant formulation to a material or materials.

The flame retardant formulation of the present invention is applied to, mixed into, and/or reacted with a material by incorporating it into the chemistry of a product. When the treated product is subjected to a flame, this produces an intumescent reaction that prevents the flame from spreading. Intumescence refers to the process when a flame retardant swells and forms multi-layer char foam in response to the exposure to heat.

The flame retardant formulation of the present invention is directly added to and/or used to coat foams, paints, wood, wood composites, resins, or any natural or synthetic material at any suitable temperature or pressure. This can be performed at any stage of generating the treated material. This can also be performed in any form of the flame retardant such as, but not limited to, liquid, powder, molten, with a binder or carrier, and any combination thereof. With respect to paints, the flame retardant may be added during the mixing process prior to using the paint for its end purpose.

The flame retardant formulations and methods of making and using thereof disclosed herein may incorporate reasonable design parameters, features, modifications, advantages, and variations that are readily apparent to those skilled in the art in the field.

EXAMPLES

Example 1

An aqueous mixture of 40 weight percent boric acid and 40 weight percent diammonium phosphate was heated and mixed until boiling. When the mixture reacted and developed into a molten state, it was poured off until cool. It was then dried, ground, and sifted through a 420 mesh screen. The resulting formulation had a pH of about 7.0.

The fire retardant formulation was dried and added to a polyester boat resin that used a methyl ethyl ketone peroxide (MEKP) hardening system to thermal cure the product. The two different percentages of the fire retardant formulation tested were 20% and 25%. The thoroughly mixed resin and fire retardant were poured into a 1.5×3.0 inch mold and dried to a thickness of approximately 0.25 inches. Once dried and cured it was cut into three test sample pieces. The test sample pieces were sanded to remove the waxy material which formed at the top as it dried. The fire testing was done using a BernzOmatic® torch held in a support apparatus approximately 0.25 inches away from the test piece. The burn time was 15 seconds. Weather conditions were 74 degrees Fahrenheit and 70% humidity. The results are shown in the following Table:

TABLE 1

Breakdown of 20% Testing with Polyester Boat Resin

| | |
|---|---|
| 1st Burn Test | 1 min 30 sec |
| 2nd Burn Test | 0 min 2 sec |
| 3rd Burn Test | 2 min 6 sec |
| Average | 1 min 2 sec |

Breakdown of 25% Testing with Polyester Boat Resin

| | |
|---|---|
| 1st Burn Test | 0 min 1 sec |
| 2nd Burn Test | 1 min 17 sec |
| 3rd Burn Test | 0 min 1 sec |
| Average | 0 min 26 sec |

Accordingly, the data show that the fire retardant composition is capable of extinguishing fire propagation when mixed with one of the most flammable materials known, polyester boat resin.

Example 2

An aqueous mixture of 3 weight percent boric acid, 14 weight percent diammonium phosphate, 13 weight percent ammonium sulfate, and less than 1 weight percent molybdenum was heated and mixed well before and during boiling until mixture was fully dissolved in solution. The resulting formulation had a pH of about 7.0 and a specific gravity of about 1.18. The formulation had a clear liquid appearance and a slight odor.

The fire retardant formulation was then diluted with water by about 2.5 times solution weight. A piece of cotton duck was saturated completely and drained to an approximate weight gain of about 2.35 times dry material weight. The dry cotton duck had a weight gain of about 5% once dried.

The cotton duck material made according to the above guidelines was sent to a certified testing lab where it passed the Small Scale Vertical Flammability Test for Treated Cotton Fabric; California Fire Marshal Title 19 1237.1 Small Scale.

Example 3

Step 1: An aqueous mixture of 2 weight percent boric acid, 7 weight percent diammonium phosphate, 7 weight percent ammonium sulfate, 2 weight percent molybdenum, 1 weight percent magnesium carbonate, and 3 weight percent calcium chloride was heated and mixed well before and during boiling until mixture was fully dissolved in solution.

Step 2: An aqueous mixture of 30 weight percent liquid latex and 2 weight percent surfactant was mixed together well and combined with the resulting solution from Step 1.

The resulting formulation from the combination of the solutions from Step 1 and Step 2 has a pH of about 7.0 and a specific gravity of about 1.10. The flame retardant formulation had a milky white appearance and a slight odor.

The fire retardant formulation made according to the above guidelines was used in straight solution to impregnate a piece of polyurethane cushion foam measuring 4"×6"×2" thickness. The foam was impregnated at 6.5 times the weight of the foam and then oven dried. The dry material weight gain was about 100%. Once dried and cured, the foam had good resilience and was not hygroscopic.

The foam test sample piece was then fire tested with a propane torch. The torch was adjusted fully open, reaching temperatures of about 3,500 degrees Fahrenheit and was held directly on or inches away during the testing, trying to burn or ignite the foam for about 5 minutes. The foam charred but did not burn. After the char was scraped off, it was revealed that the foam underneath was untouched showing that the foam test sample was fully fire retarded.

Without departing from the scope and spirit of the present invention, reasonable features, modifications, advantages, and design variations of the claimed flame retardant formulations and methods will become readily apparent to those skilled in the art by following the guidelines set forth in the preceding detailed description and embodiments.

The invention claimed is:

1. A method of generating a non-toxic flame retardant formulation comprising:
   mixing boric acid, diammonium phosphate, and water together to form an aqueous solution;
   heating the aqueous solution until boiling;
   further heating to cause the aqueous solution to develop into a molten state to form a molten state solution; and
   cooling the molten state solution.

2. The method of claim 1, further comprising:
   drying the cooled solution to form a dried solution; and
   grinding the dried solution to form a powder.

3. The method of claim 2, further comprising:
   sifting the powder through a screen.

4. The method of claim 3, wherein the screen is a 420 mesh screen.

5. The method of claim 4, further comprising:
   adding the powder to a polyester resin to form a product; and
   thermally curing the product using a methyl ethyl ketone peroxide (MEKP) hardening system.

6. The method of claim 1, wherein the ratio, by weight, of boric acid to diammonium phosphate is not one to one.

7. The method of claim 1, wherein water, boric acid, and diammonium phosphate are in a ratio, by weight, of 20, 40, and 40, respectively.

8. A method of generating a non-toxic flame retardant formulation comprising:
   mixing a solution consisting of boric acid, diammonium phosphate, and water to form an aqueous solution;
   heating the aqueous solution until boiling;
   further heating to cause the aqueous solution to develop into a molten state to form a molten state solution; and
   cooling the molten state solution.

9. The method of claim 8, further comprising:
   drying the cooled solution to form a dried solution; and
   grinding the dried solution to form a powder.

10. The method of claim 9, further comprising:
    sifting the powder through a screen.

11. The method of claim 9, further comprising:
    adding the powder to a polyester resin to form a product; and
    thermally curing the product using a methyl ethyl ketone peroxide (MEKP) hardening system.

12. The method of claim 8, wherein water, boric acid, and diammonium phosphate are in a ratio, by weight, of 20, 40, and 40, respectively.

* * * * *